(12) United States Patent
Mendoza

(10) Patent No.: US 10,648,506 B2
(45) Date of Patent: May 12, 2020

(54) WALKING RIG CREEPER INTERFACE

(71) Applicant: Raul Mendoza, Houston, TX (US)

(72) Inventor: Raul Mendoza, Houston, TX (US)

(*) Notice: Subject to any disclaimer, the term of this patent is extended or adjusted under 35 U.S.C. 154(b) by 0 days.

(21) Appl. No.: 15/644,733

(22) Filed: Jul. 7, 2017

(65) Prior Publication Data
US 2018/0010635 A1 Jan. 11, 2018

Related U.S. Application Data

(60) Provisional application No. 62/359,594, filed on Jul. 7, 2016.

(51) Int. Cl.
| | | |
|---|---|---|
| *F16C 29/04* | (2006.01) | |
| *E21B 7/02* | (2006.01) | |
| *E21B 15/00* | (2006.01) | |
| *B62D 57/00* | (2006.01) | |
| *B65G 17/24* | (2006.01) | |
| *B62D 57/032* | (2006.01) | |
| *F16G 13/06* | (2006.01) | |
| *B65G 7/12* | (2006.01) | |
| *E04B 1/36* | (2006.01) | |

(52) U.S. Cl.
CPC ............ *F16C 29/045* (2013.01); *B65G 17/24* (2013.01); *E21B 15/003* (2013.01); *B62D 57/032* (2013.01); *B65G 7/12* (2013.01); *E04B 1/36* (2013.01); *E21B 7/02* (2013.01); *F16C 2240/12* (2013.01); *F16C 2300/14* (2013.01); *F16C 2352/00* (2013.01); *F16G 13/06* (2013.01)

(58) Field of Classification Search
CPC .. F16C 29/005; F16C 29/045; F16C 2240/12; F16C 2300/14; F16C 2352/00; F16C 2326/58; B62D 57/032; B65G 7/04; B65G 7/12; B65G 17/24; F16G 13/06; E01D 19/043; E04B 1/36; E21B 7/02
USPC .......... 384/36, 49, 50, 54, 58; 405/201, 213; 198/779, 804, 824; 414/217; 193/35 R, 193/37
See application file for complete search history.

(56) References Cited

U.S. PATENT DOCUMENTS

| | | | | |
|---|---|---|---|---|
| 3,509,978 | A * | 5/1970 | Bedford | B65G 1/023 |
| | | | | 193/35 R |
| 4,067,428 | A * | 1/1978 | Shuttleworth | B65G 13/11 |
| | | | | 193/35 R |
| 4,681,203 | A * | 7/1987 | Kornylak | B65G 13/11 |
| | | | | 193/35 R |

(Continued)

FOREIGN PATENT DOCUMENTS

| | | | | |
|---|---|---|---|---|
| EP | 0887287 A1 * | 12/1998 | | B65G 13/00 |
| GB | 1009567 A * | 11/1965 | | F16G 13/06 |

(Continued)

*Primary Examiner* — Marcus Charles
(74) *Attorney, Agent, or Firm* — Law Office of Craig Bohn; Craig E. Bohn

(57) ABSTRACT

A walking foot for a drilling rig comprising a foot plate attacheable to a drilling rig by an travel plate, capable of functionally bearing a load in excess a quarter of the weight of a drilling rig, comprising a planar roller array wherein a plurality of load rollers with parallel rotational axes are dispersed both laterally and longitudinally within the plane, so as to fractionalize a weight applied perpendicular to the plane, and thereby promote longitudinal motion of the roller array in a direction perpendicular to the plurality of roller rotational axes.

14 Claims, 4 Drawing Sheets

(56) References Cited

U.S. PATENT DOCUMENTS

| | | | | |
|---|---|---|---|---|
| 5,096,050 | A * | 3/1992 | Hodlewsky | B65G 13/12 193/35 R |
| 5,492,436 | A * | 2/1996 | Suksumake | E02B 17/00 166/366 |
| 6,409,026 | B2 * | 6/2002 | Watanabe | A47F 1/12 211/59.2 |
| 6,471,045 | B1 * | 10/2002 | Harden | B65G 15/24 198/817 |
| 7,886,892 | B2 * | 2/2011 | Fourney | B65G 47/34 198/370.03 |
| 8,276,772 | B2 * | 10/2012 | Kim | A47F 1/12 211/151 |
| 2006/0011454 | A1 * | 1/2006 | Stebnicki | B65G 17/40 198/779 |
| 2010/0206829 | A1 * | 8/2010 | Clements | A47F 1/12 211/162 |
| 2012/0219242 | A1 * | 8/2012 | Stoik | E21B 15/003 384/36 |
| 2017/0327166 | A1 * | 11/2017 | Smith | E21B 15/003 |
| 2017/0334661 | A1 * | 11/2017 | Stefanko | B65G 47/268 |

FOREIGN PATENT DOCUMENTS

| | | | | |
|---|---|---|---|---|
| GB | 1044522 A | * | 10/1966 | B61J 3/08 |
| JP | 2001260720 A | * | 9/2001 | B61B 13/06 |
| JP | 2001301983 A | * | 10/2001 | B61B 13/00 |
| WO | WO-9953204 A1 | * | 10/1999 | F15B 15/082 |

* cited by examiner

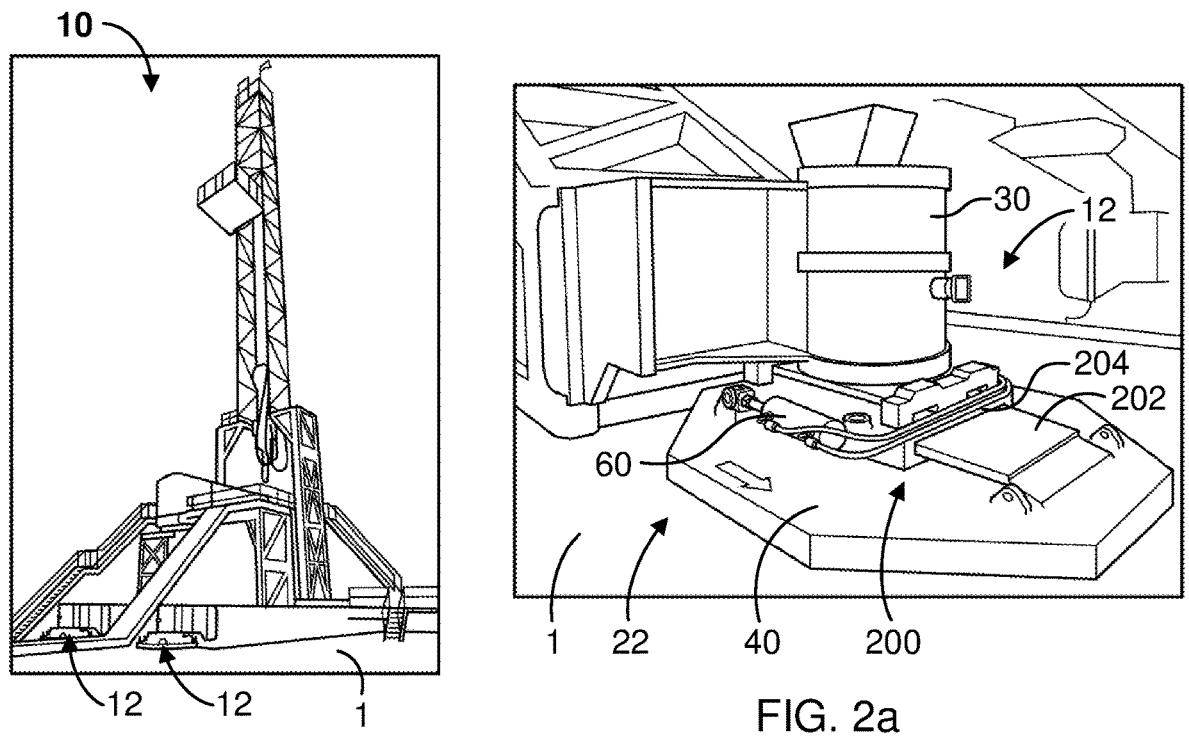
FIG. 1
FIG. 2a
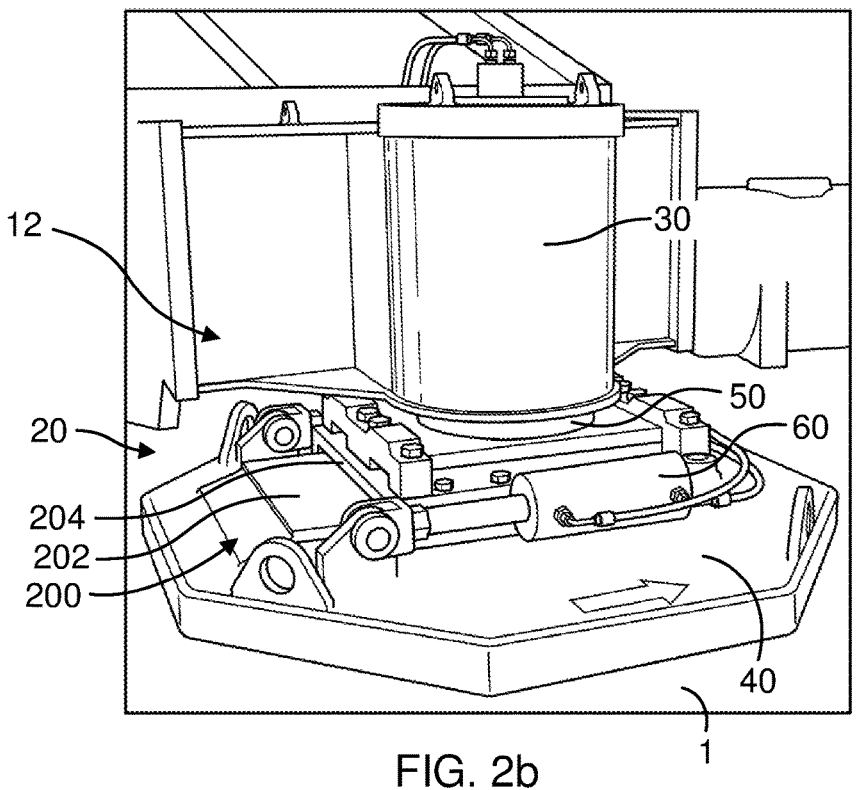
FIG. 2b

WALKING RIG CREEPER INTERFACE

CROSS-REFERENCE TO RELATED APPLICATIONS

This application claims the benefit of U.S. Application No. 62/359,594, filed on Jul. 7, 2016, by the present inventor, entitled "Walking Rig Creeper Interface," which is hereby incorporated by reference in its entirety for all allowable purposes, including the incorporation and preservation of any and all rights to patentable subject matter of the inventor, such as features, elements, processes and process steps, and improvements that may supplement or relate to the subject matter described herein.

STATEMENT REGARDING FEDERALLY SPONSORED RESEARCH OR DEVELOPMENT

Not Applicable

BACKGROUND OF THE INVENTION

The present invention relates generally to a relocation system for extremely heavy equipment over natural terrain, and more specifically to an improved extreme load creeper interface that may have a plurality of aligned extreme load rollers dispersed over an area, which enables, for example, the functional support and movement of a drilling rig at a drilling sight through manipulation of a plurality of rig walking feet.

SUMMARY OF THE INVENTION

The current development is a creeper interface comprising an extreme-load roller array and assemblages that distributes the weight of an extreme load both laterally and longitudinally over a planar area to fractionalize a load on a particular roller assembly, and facilitates movement of a first surface with regard to a second surface of the creeper interface.

Even in the 1950's the drilling industry struggled with the ability to move and adjust the location of drilling rigs once assembled generally at a drilling location, or to an adjacent drilling sight. The need spawned various manifestations of walking leg assemblies, the development of which continue to respond to new challenges. One of these challenges of particular note is the growing weight of rigs, which now range into the 10's of thousands of tons.

BRIEF DESCRIPTION OF THE DRAWINGS

FIG. 1 is a photograph of a drilling rig with walking leg attachments capable of employment the creeper interface of the present invention.

FIGS. 2a and 2b are oblique photographs of similar walking leg attachments that may house the creeper interface of the present invention.

DESCRIPTION OF THE PREFERRED EMBODIMENT

Figure 3:
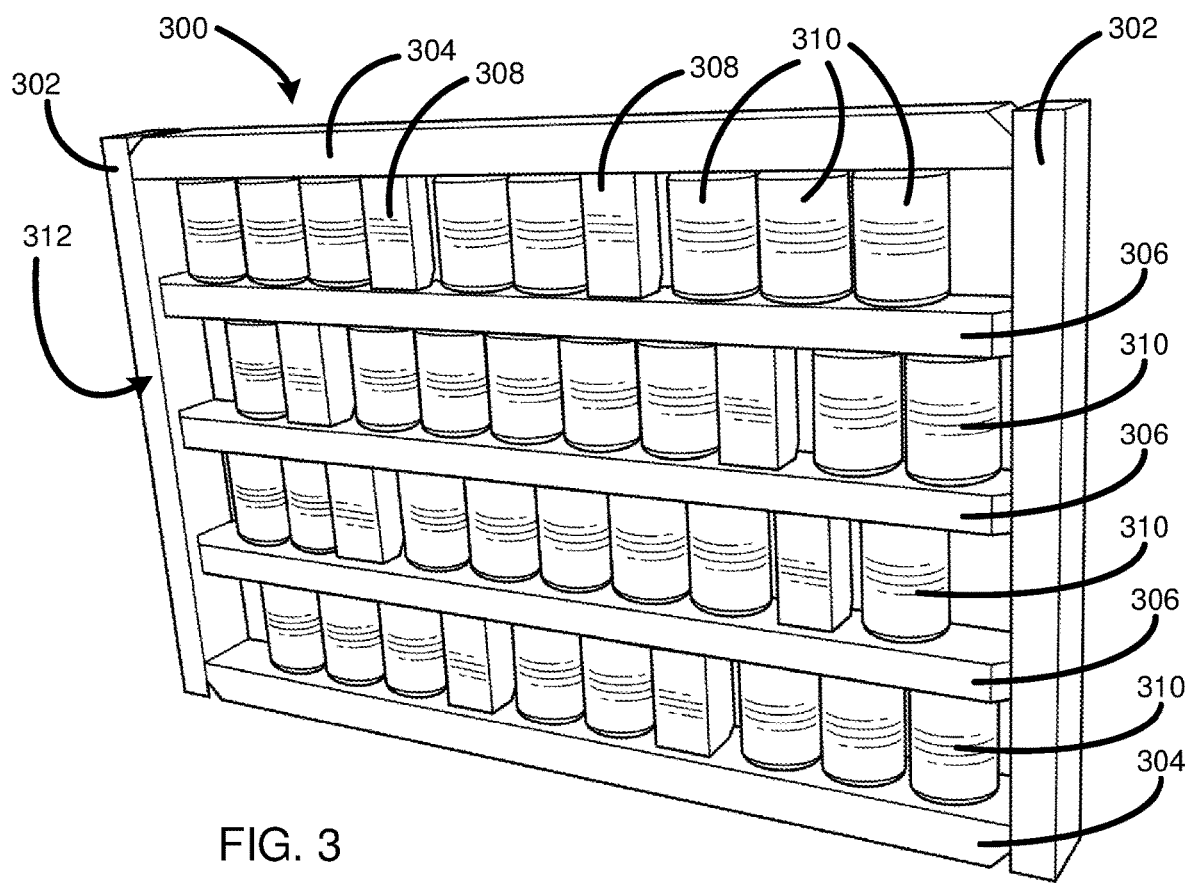
FIG. 3 is an oblique photograph of the static surface of an exemplary roller array according to the present disclosure.

Referring to FIG. 1, a typical walking drilling rig 10 may be configured with walking legs 12. Referring now primarily to FIGS. 2a and 2b, an exemplary embodiment of a walking leg 12 may have a walking foot 20 operably attached to a stand actuator 30. The exemplary walking foot 20 may comprise a creeper interface 200, a foot plate 40, a pivot spindle 50, and a travel actuator 60. The exemplary walking foot 20 may be pivotably attached to the stand actuator 30 via a portion of the pivot spindle 50. Pivot spindle 50 may be partially insertable and rotatable within the stand actuator 30. The stand actuator 30 may be capable of asserting pressure from the walking rig 10 to the walking foot 20 through the pivot spindle 50.

The exemplary stand actuator may have a hydraulic fluid supply that may be controllably forced or released to selectively effect the application of pressure on the walking foot 20. The exemplary pivot spindle 50 may be connected to the top of the creeper interface 200. The exemplary foot plate 40 may be attached to the creeper interface 200 opposite the pivot spindle 50. The foot plate 40 is designed and configured to rest upon the surface 1 on which the walking drilling rig 10 is to operate. The exemplary foot plate 40 may be relatively wide laterally and long longitudinally, so it may disperse the weight of the load that may be placed upon it. Similarly, the exemplary creeper interface 200 may be relatively wide laterally and long longitudinally, so it may disperse the weight of the load that may be placed upon it.

In the exemplary embodiment, creeper interface 200 may comprise a bearing plate 202 and a travel plate 204. In the exemplary embodiment, the travel plate 204 is intermediate the bearing plate 202 and the foot plate 40. So configured the exemplary bearing plate 202 may be described as being above, or on top of, the exemplary travel plate 204. In an alternate exemplary embodiment the travel plate 204 may be positioned above, or on top of, the bearing plate 202. Such modification would still be within the bounds of the present development.

In the exemplary embodiment, one end of a travel actuator 60 may be functionally linked to the bearing plate 202. A second end of the exemplary travel actuator 60 may be functionally linked to the travel plate 204. So configured the extension of the travel actuator 60 may affect longitudinal motion of the travel plate 204 with respect to the bearing plate 202 in a first direction, and retraction of the travel actuator 60 may affect longitudinal motion of the travel plate 204 with respect to the bearing plate 202 in a second opposite direction.

Figure 4:
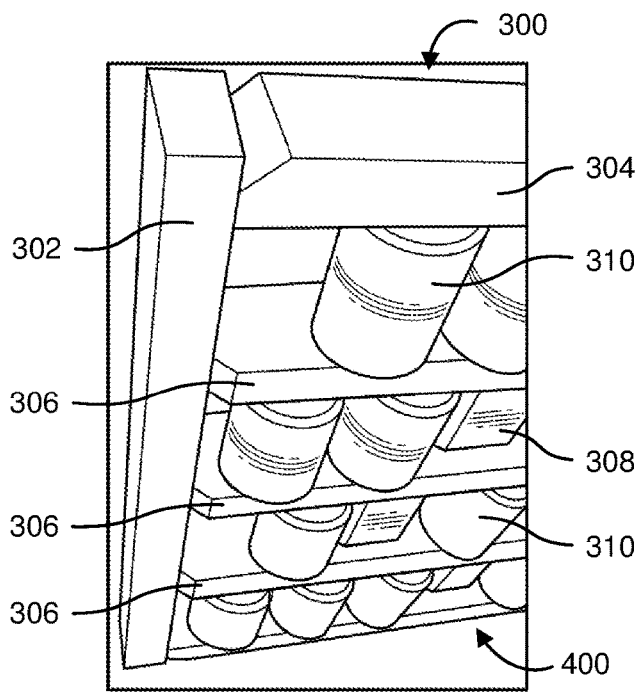
FIG. 4 is an oblique photograph of a corner of the active surface of the exemplary roller array of FIG. 3.
Figure 5:
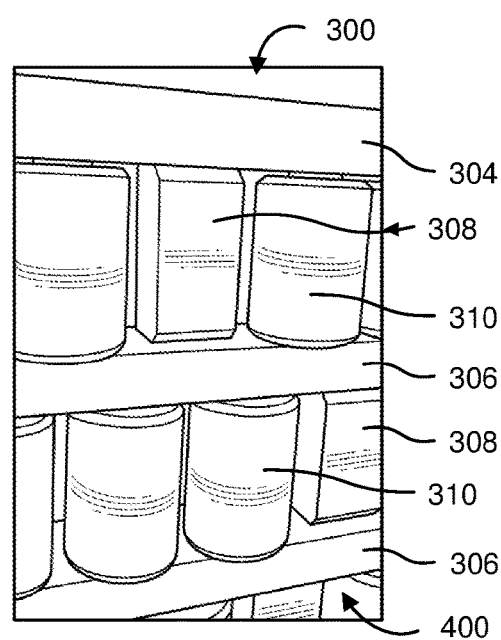
FIG. 5 is an oblique photograph of a segment of the active surface of the exemplary roller array of FIG. 3.

Referring now primarily to FIGS. 3 through 5, an exemplary travel plate 204 may comprise a roller array 300. Roller array 300 may comprise a pair of end rails 302, a pair of side rails 304, an interior rail 306, a lateral support 308, and a plurality of rollers 310. Exemplary end rails 302 provide lateral support and structure across the ends of the roller array 300. Exemplary side rails 304 and interior rail 306 provide longitudinal support and structure. In the exemplary embodiment, the end rails 302, side rails 304, and interior rail 306, in conjunction with the lateral supports 308, which may be spaced between pairs of either side rails 304 or interior rails 306, may reinforce and maintain a planar configuration of the roller array 300, and alignment of the rollers 310.

In the exemplary embodiment, the side of the roller array 300 from which the rollers 310 are withdrawn may be referred to as static surface side 312. In the exemplary embodiment, the side of the roller array 300 from which the rollers 310 slightly protrude may be referred to as active surface side 400.

Figure 6:
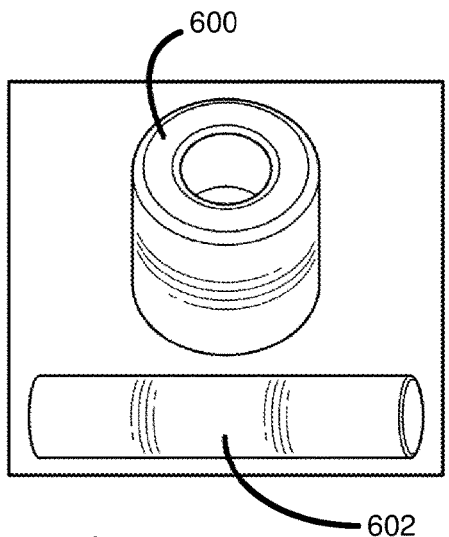
FIG. 6 is an oblique photograph of an exemplary roller assembly and roller pin.
Figure 7:
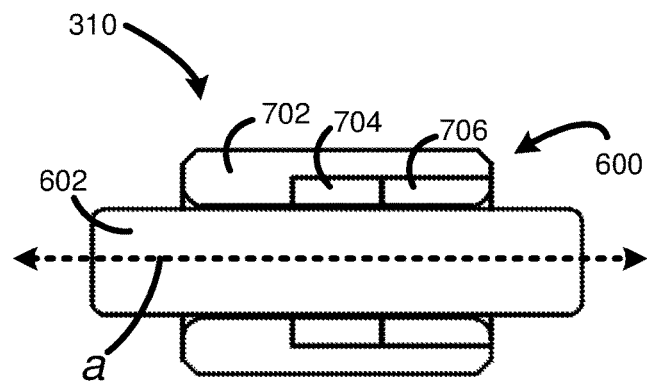
FIG. 7 is a side view schematic illustration of an exemplary roller cut in half through the rotational axis.
Figure 8:
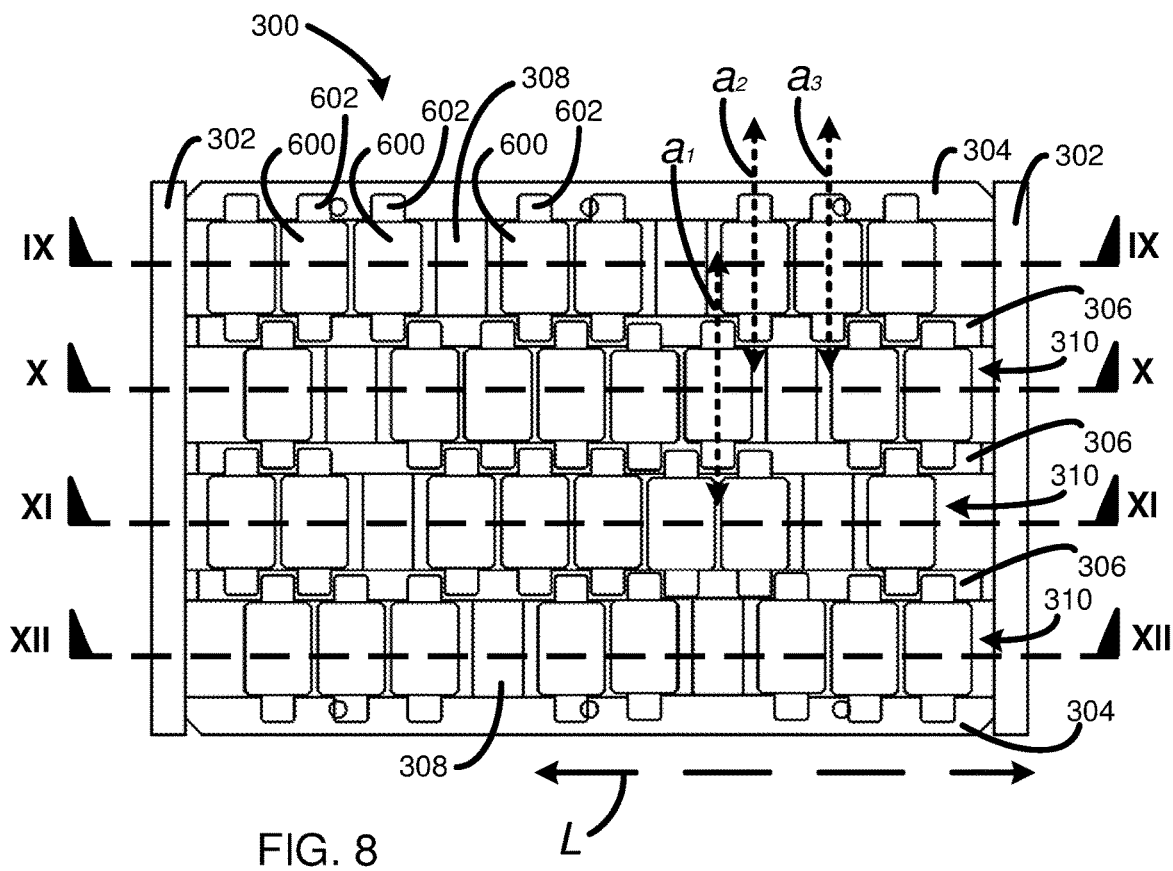
FIG. 8 is a schematic illustration of a view normal to the static surface of an exemplary embodiment according to the present disclosure. a1
Figure 9:
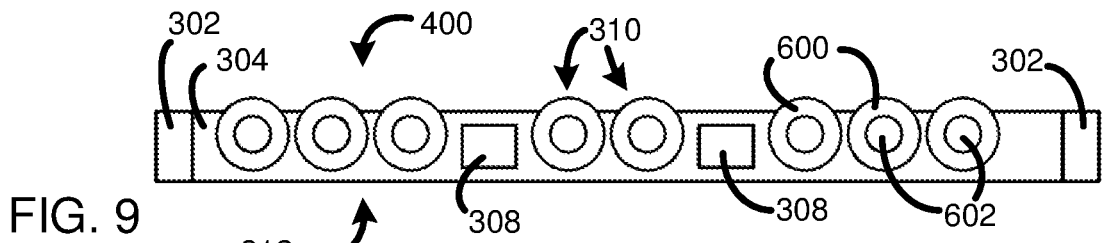
FIG. 9 is a schematic illustration of a side view of a bank of rollers cut through by line IX-IX in FIG. 8.
Figure 10:
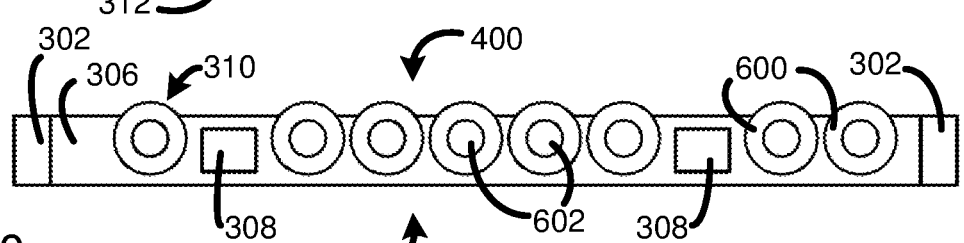
FIG. 10 is a schematic illustration of a side view of a bank of rollers cut through by line X-X in FIG. 8.
Figure 11:
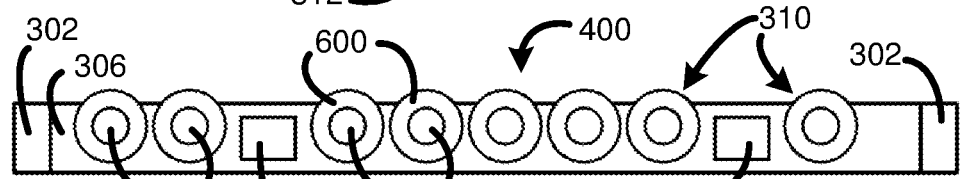
FIG. 11 is a schematic illustration of a side view of a bank of rollers cut through by line Xl-Xl in FIG. 8.
Figure 12:
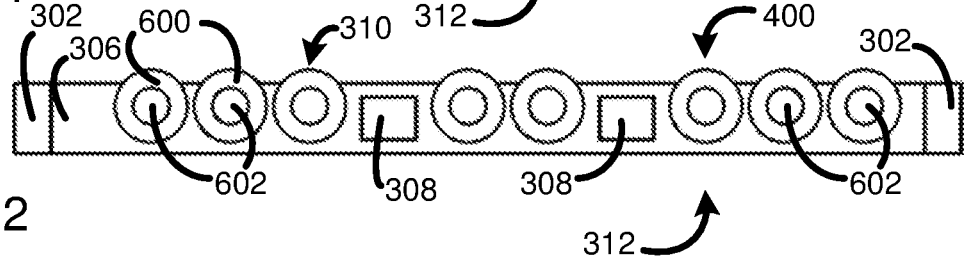
FIG. 12 is a schematic illustration of a side view of a bank of rollers cut through by line Xll-Xll in FIG. 8.

Referring now primarily to FIGS. 6 and 7, an exemplary roller 310 may comprise a roller assembly 600 and a roller pin 602. Each of roller assembly 600 and a roller pin 602 may have a rotational axis a, both individually and when assembled into roller 310. In the exemplary embodiment, roller assembly 600 may comprise a roller body 702, a reduced friction bushing 704, and a support bushing 706, which each may also have an individual rotational axis a, and which may be mergeable into a single joint axis a when properly assembled into either or both roller assembly 600 and roller 310.

In the exemplary embodiment, roller pin 602, roller body 702, and support bushing 706 may each be formed from high tensile strength steel. Other materials with the physical strength to withstand the extreme loads of a particular use may be suitable. The exemplary reduced friction bushing 704 may be comprised of oil impregnated bronze, such as a material marketed through National Bronze & Metals, Inc., in Houston, Tex. Other materials may be suitable, such as high-strength Teflon®, other high-strength polymers or ceramics, and other metals, any of which may be potentially impregnated with other friction reducers, such as carbon or silicon.

Referring now primarily to FIGS. 8 through 14, in the exemplary embodiment, a roller array 300 is comprised of multiple rollers 310 arranged in a plane. In the exemplary embodiment, each roller 310 in the roller array 300 may have a rotational axis ($a_1$, $a_2$, $a_3$), and each of the multiple axes may be parallel. So aligned, the exemplary embodiment may have a longitudinal line-of-travel L that is perpendicular to the aligned axes.

An exemplary roller array 300 may be constructed to be broad laterally, and may be comprised of multiple rollers 310 spaced apart laterally. Additionally, an exemplary roller array 300 may be constructed to be long longitudinally, and may be comprised of multiple rollers 310 spaced apart longitudinally. In the exemplary embodiment, multiple rollers 310 may be configured in linear banks of parallel rollers 310. The exemplary rollers 310 may be held in position by seating the ends of the roller pins 602 into recesses in the longitudinal side rails 304 and interior rail 306. In the exemplary embodiment, multiple banks of rollers 310 positioned along sectional lines IX-IX, X-X, Xl-Xl, and Xll-Xll, may be dispersed longitudinally along the length of each bank of rollers 310. The dispersion of the rollers 310 along each bank, along with interspersed lateral supports 308, may be coordinated with the adjacent banks to provide adequate planar separation to spread out the load that may be applied thereto.

Referring now primarily to FIGS. 9 through 12, the exemplary banks of rollers 310 along sectional lines IX-lX, X-X, Xl-Xl, and Xll-Xll, individually shown in profile may demonstrate the longitudinal dispersion of the rollers 310. The exemplary pattern of roller 310 dispersement, both laterally and longitudinally, may effectively factionalize a load applied to the static surface 312 and translated through to the active surface 400. It is envisioned that other patterns of dispersement may be effective, and may be anticipated as discoverable as an optimization by this disclosure.

Figure 13:
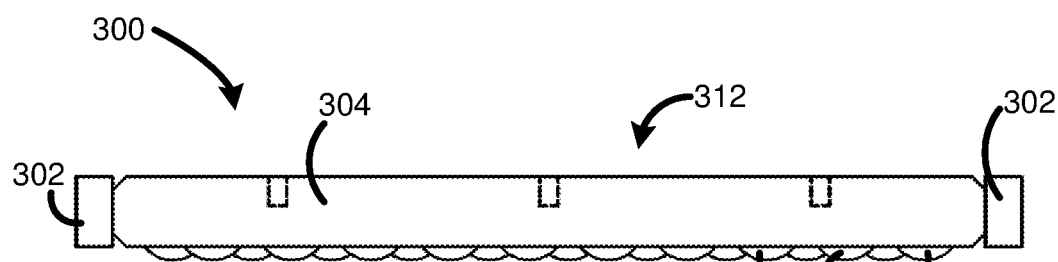
FIG. 13 is an illustration of a side view of an exemplary roller array according to the present disclosure.
Figure 14:
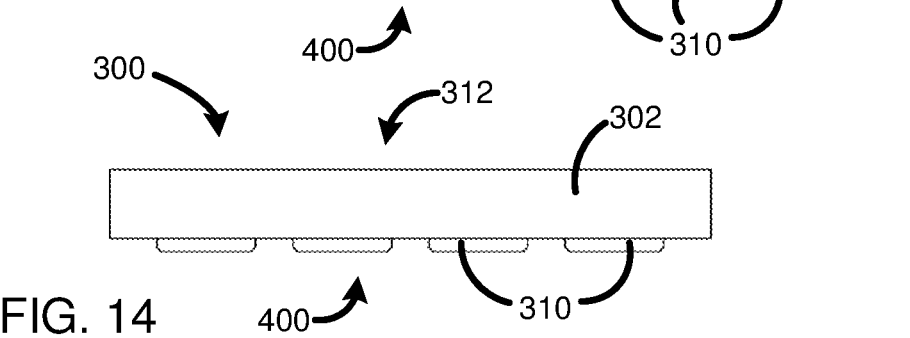
FIG. 14 is an illustration of an end view of an exemplary roller array according to the present disclosure.

Referring now primarily to FIGS. 13 and 14, the side views of the roller array 300 from both the longitudinal sides, parallel to the line-of-travel L, and the lateral ends, perpendicular to the line-of-travel L, may illustrate that the plurality of rollers 310 within the roller array 300 do not protrude from the static surface 312, but do protrude from the active side 400. As such, the roller array 300 may be a suitable travel plate 204, where the static surface 312 is positioned away from a bearing plate 202, and the active surface 400 is positioned for contact with a bearing plate 202.

The examples and descriptions contained in this specification are merely possible implementations of the current development, and alternatives may still fall within the scope of the allowed claims. The present invention should only be limited by the following claims and their legal equivalents, since the provided exemplary embodiments are only examples of how the invention may be employed, and are not exhaustive.

I claim:

1. A walking foot for a drilling rig having a walking leg, comprising:
    a spindle attached to the walking leg;
    a foot plate;
    a travel actuator functionally attached to the spindle and the foot plate;
    a travel plate capable of functionally supporting a load in excess of a quarter of the weight of a drilling rig, the travel plate comprising:
        a planar roller array comprising a plurality of load rollers;
        the planar roller array having a line-of-travel;
        each said load rollers having a rotational axis;
        each of the plurality of load rollers mounted rotatably on a roller pin;
        the plurality of rotational axes being parallel to each other, and perpendicular to the line-of-travel; and
        the plurality of load rollers being dispersed within the planar roller array;
    the travel plate intermediate the spindle and the foot plate; and
    the travel plate fixedly attached to one of either the spindle and the foot plate, and rollably interfaceable with the other of the spindle and the foot plate.

2. The walking foot of claim 1, wherein the spindle being pivotably attached to the walking leg.

3. The walking foot of claim 2, wherein the plurality of load rollers being arranged linear banks within the planar roller array.

4. The walking foot of claim 2, wherein the plurality of load rollers being spaced apart laterally within the planar roller array.

5. The walking foot of claim 2, wherein the plurality of load rollers being spaced apart longitudinally within the planar roller array.

6. The walking foot of claim 2, wherein the travel plate further comprising:
   a pair of longitudinal side rails; and
   an end of at least one roller pin attached to each longitudinal side rail.

7. The walking foot of claim 2, wherein the travel plate further comprising:
   an interior rail; and
   an end of at least one roller pin attached to the interior rail.

8. The walking foot of claim 1, wherein the plurality of load rollers being arranged linear banks within the planar roller array.

9. The walking foot of claim 1, wherein the plurality of load rollers being spaced apart laterally within the planar roller array.

10. The walking foot of claim 1, wherein the plurality of load rollers being spaced apart longitudinally within the planar roller array.

11. The walking foot of claim 1, wherein the travel plate further comprising:
    a pair of longitudinal side rails; and
    an end of at least one roller pin attached to each longitudinal side rail.

12. The walking foot of claim 1, wherein the travel plate further comprising:
    an interior rail; and
    an end of at least one roller pin attached to the interior rail.

13. A walking foot for a drilling rig having a walking leg, comprising:
    a spindle attached to the walking leg;
    a foot plate;
    a travel actuator functionally attached to the spindle and the foot plate;
    a travel plate capable of functionally supporting a load in excess of a quarter of the weight of a drilling rig, the travel plate comprising:
    a planar roller array comprising a plurality of load rollers;
    the planar roller array having a line-of-travel;
    each said load rollers having a rotational axis;
    each of the plurality of load rollers mounted rotatably on a roller pin;
    the plurality of rotational axes being parallel to each other, and perpendicular to the line -of-travel;
    the plurality of extreme load rollers being dispersed within the planar roller array;
    a pair of longitudinal side rails and an interior rail;
    the interior rail parallel to the longitudinal side rails;
    an end of at least one roller pin attached to each longitudinal side rail; and
    an end of at least one roller pin attached to the interior rail.

14. The walking foot of claim 13, wherein the spindle being pivotably attached to the walking leg.

* * * * *